United States Patent [19]

Ty et al.

[11] Patent Number: 4,921,165
[45] Date of Patent: May 1, 1990

[54] AUTOMOTIVE OIL LEVEL CONTROL VALVE APPARATUS

[75] Inventors: Henry Ty, Attleboro; Narendra R. Zaveri, Attleboro Falls, both of Mass.; Alfred J. White, N. Providence, R.I.

[73] Assignee: Texas Instruments Incorporated, Dallas, Tex.

[21] Appl. No.: 366,904

[22] Filed: Jun. 14, 1989

[51] Int. Cl.$^5$ ............................................. G05D 23/08
[52] U.S. Cl. .............................. 236/93 R; 236/101 C; 236/101 E
[58] Field of Search ............. 236/93 R, 101 C, 101 E, 236/101 R

[56] References Cited

U.S. PATENT DOCUMENTS

| 1,886,368 | 11/1932 | Blancke | 236/93 R X |
| 2,101,338 | 12/1937 | Lovekin | 236/93 R X |
| 2,337,077 | 12/1943 | Woodman | 236/93 R X |
| 2,464,482 | 3/1949 | Birkemeier | 236/93 R X |
| 2,677,501 | 5/1954 | Raymond et al. | 236/93 R |
| 2,715,420 | 8/1955 | Stearns | 236/101 E X |
| 3,595,475 | 7/1971 | Morton | 236/93 R |
| 3,980,103 | 9/1976 | Drzewiecki | 236/93 R X |

Primary Examiner—William E. Tapolcai
Attorney, Agent, or Firm—John A. Haug; James P. McAndrews; Melvin Sharp

[57] ABSTRACT

A fluid level control valve has a base with an aperture formed therein. A cover is slidingly disposed over the aperture and is biased by a thermostatic element in a direction tending to close the aperture. In one embodiment the thermostatic element is an elongated strip having one end captured by tabs projecting from the base, and an opposite end is captured by a bracket formed on the base. The thermostatic element is formed with a V-shaped formed imparing portion which is aligned with the cover and the position of the bracket is adjustable to place a selected force on the cover through the thermostatic element. The calibrated valve is then fixedly attached to a housing with the aperture aligned with an aperture in the housing. In another embodiment a U-shaped thermostatic strip has one end mounted on the base with its opposite end biased against the cover.

15 Claims, 5 Drawing Sheets

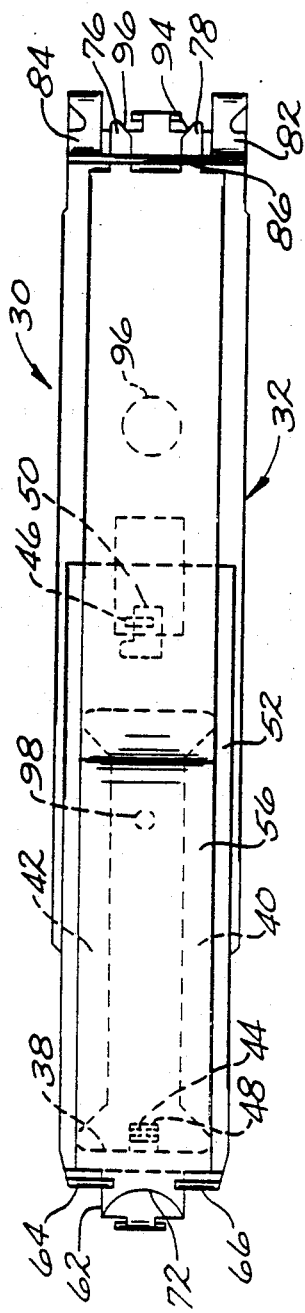
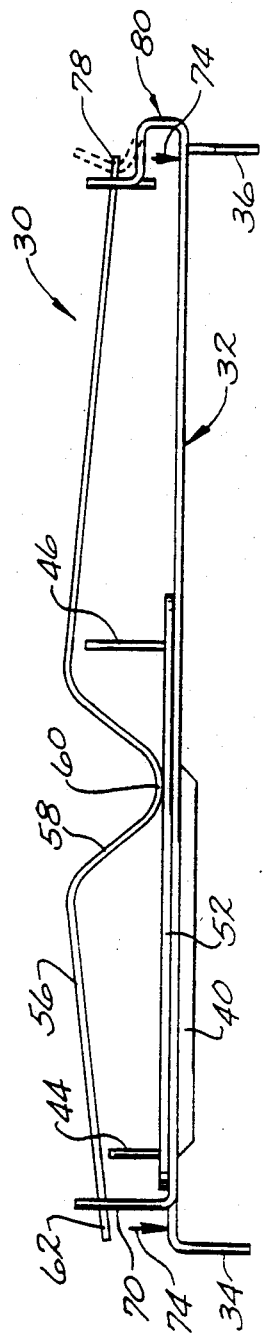
Fig. 3.
Fig. 4.

AUTOMOTIVE OIL LEVEL CONTROL VALVE APPARATUS

This application contains subject matter described and claimed in copending application, Ser. No. 264,288 filed Oct. 28, 1988 and assigned to the assignee of the present invention.

This application relates generally to a fluid control valve and more particularly to a temperature responsive valve for use with transmission oil reservoir.

Hydraulic pressure systems as used in motor vehicles require a supply of transmission fluid and maintaining an adequate oil level in the transmission oil pan at all operating temperatures is essential for trouble free transmission performance. Conventionally the oil pan serves as a sump to provide the necessary supply, however, in front wheel drive vehicles the transmission oil pan is too shallow to hold a suitable quantity. The problem is exacerbated by the fact that the volume of the oil used expands in the order of thirty-eight percent at elevated temperatures. The problem has been dealt with by employing an auxiliary reservoir, for example, in the side of the transmission case cover. The fluid level in the auxiliary reservoir is controlled by a thermostatic element which controls the opening and closing of a cover plate in the transmission housing in response to the temperature of the oil in the auxiliary reservoir. As the temperature of the oil in the reservoir decreases the cover plate opens allowing the oil to drain into the lower sump or oil pan to maintain the desired oil level.

However, the operation of the control has been inconsistent from one transmission to another and has resulted in inadequate control of the oil level in a significant portion of the vehicles in which the transmissions are incorporated.

SUMMARY OF THE INVENTION

Accordingly, it is an object of the present invention to provide a thermostatically controlled valve which will consistently provide desired oil level control in an automotive transmission oil pan. Another object is the provision of such a control which is inexpensive and is more easily installed than conventional devices. Yet another object is the provision of a control valve which is simple yet one which is reliable and consistent as used from one transmission to another.

Other objects and features of the invention will become more readily understood from the following detailed description and drawings in which like reference numerals designate like parts throughout the figures thereof.

As shown in copending application, Ser. No. 264,288 referred to supra, a valve assembly comprises an elongated base member having an aperture formed therein and having upstanding posts on either end of the aperture. A cover having post receiving apertures is slidingly received on the posts and is adapted to move from a position closing the aperture to a position in which the aperture is open. A thermostatic element in the form of an elongated strip has a generally V-shaped force imparting portion intermediate its ends mounted on the base with the force imparting portion intermediate its ends mounted on the base with the force imparting portion aligned with the cover. One end of the strip is captured by taps extending from one end of the base while the other end of the strip is captured by a bracket formed on the other end of the base. The position of the bracket is adjustable by bending a pair of legs connected to a transversely extending stop member until a desired force is imparted to the cover at a selected temperature.

Briefly, in accordance with the present invention, a generally U-shaped strip of thermostatic material has a first end mounted on one of a pair of post members extending upwardly from the base plate and has a second, opposite end biased against the cover plate which is slidably mounted between the post members. According to a feature of the invention the cover plate and the thermostatic strip are formed with curved surfaces to produce a sliding point contact to enhance consistent modulation. According to another feature the first end includes a portion of the bight of the U-shaped configuration with an aperture formed in the bight portion and another in the distal end adapted to lockingly receive the one post member through both apertures in a calibrated position. Slit stud members also project upwardly from the base plate and are adapted to be received in bores provided on an automotive transmission body casting.

BRIEF DESCRIPTION OF THE DRAWINGS

FIG. 3 shows a top plan view of an oil level control valve made as shown and described in copending application referenced supra;

FIG. 4 is a front elevational view of the FIG. 3 valve;

With reference to FIGS. 1 and 2, a broken away portion of a transmission case cover 10 is shown having a drain passage 12 leading to an auxiliary reservoir. A conventional control for providing an adequate supply of oil in the sump positioned below the drain passage comprises a cover plate 14 disposed over the passage 12 slidably mounted on pins 16, 18 so that the cover can move between a closed position as shown in FIG. 1 (when the vehicle is not in operation) and an opened position shown in FIG. 2. A thermostatic element 20 in the form of an elongated strip having pin receiving slots at its opposite ends is mounted on pins 18 and 22 and captured there by the busings 17 and 23. Element 20 is formed intermediate its ends with a generally V-shaped force imparting portion 24 having apex 26 in engagement with cover plate 14. Element 20 is mounted on case cover 10 by inserting pins 18 and 22 through respective slot and hole in element 20 with pin 18 also inserted through a slot in cover plate 14 and then driving the pins into respective bores 19, 21 in the transmission case cover in an interference fit to a selected dimension "d" as shown in FIG. 1 at a selected temperature, e.g., normal room temperature. During operation oil circulates through the transmission system with the oil pushing the cover plate toward the open position against the bias of the thermostatic element. As the temperature of the oil in the auxiliary reservoir increases, its temperature is transferred to thermostatic element 20 and the force exerted by element 20 through apex 26 on cover plate 14 increases until at some elevated temperature the cover plate is nearly in a closed position as indicated by the dashed lines of cover 14 in FIG. 1. When the oil is cold, however, less force is exerted by element 20 so that the pressure exerted by the oil in passage 12 pushes cover 14 toward a regulated opened position shown in FIG. 2 allowing the oil in the auxiliary reservoir to drain into the oil sump (see arrows 28) to maintain the desired level in the sump.

Figure 1:
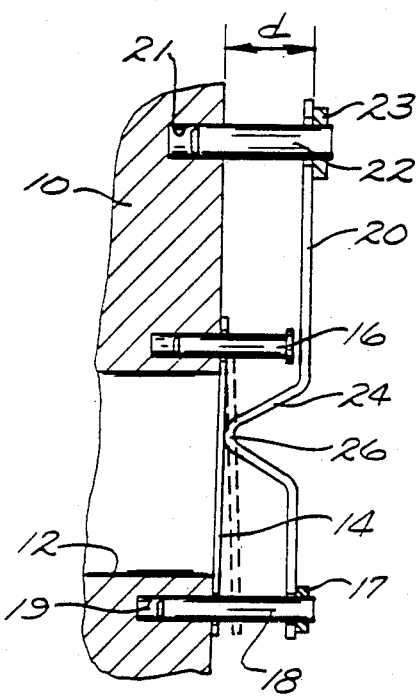
FIGS. 1 and 2 show a prior art device comprising a cover plate movably mounted over a drain aperture on the side of a transmission case cover under the control of a thermostatic element and being movable between a closed position (FIG. 1) and an opened position (FIG. 2)

Although this control works well in some installations there has been a vexing problem of inconsistency from one transmission to another affecting the performance of the control. Element 20 is a simple stamped part and its precise configuration tends to vary slightly from one part to another, however, the dimension "d" is the same for all the controls. This has resulted in a variance of up to 30% from the designed force level at a given temperature. In order to avoid the possibility of having inadequate lubrication which would result when there is insufficient oil in the sump there has been a tendency to increase the amount of oil so that in the worst case of a variance from the designed force lever there is an adequate supply. However, this causes problems in units in which the control does not vary significantly from the designed level resulting in too much oil in the sump causing frothing with concomitant deleterious effects on the performance of the transmission due to the presence of air in the hydraulic system.

The control valve made in accordance with the invention overcomes this problem by providing a unit which is individually calibrated to a desired force exerted on the cover at a selected temperature with the calibrated unit then installed on the transmission case cover so that the performance of the control is consistent from one transmission to another.

With reference to FIGS. 3-6, numeral 30 designates a control valve as described and claimed in copending application, Ser. No. 364,288 referenced supra, a base 32 formed of suitable material such as a 400 series stainless steel is generally in the form of an elongated rectangle having downwardly depending tangs 34, 36 at respective opposite ends thereof. Base 32 is formed with an aperture 38 therethrough which generally matches that of passage 12 of the transmission case cover 10 with tangs 34, 36 respectfully received in bores 19, 21 formed in housing 10. Base 32 is preferably formed with ribs 40, 42 depending therefrom along the length of aperture 38 to enhance the rigidity of the base.

First and second posts 44, 46 extend upwardly from base 32 and are slidingly received through respective apertures 48, 50 formed in a cover 52. Cover 52 is slidingly movable on posts 44, 46 in a manner similar to cover 14's movability on pins 16, 18 in FIGS. 1 and 2.

Figure 2:
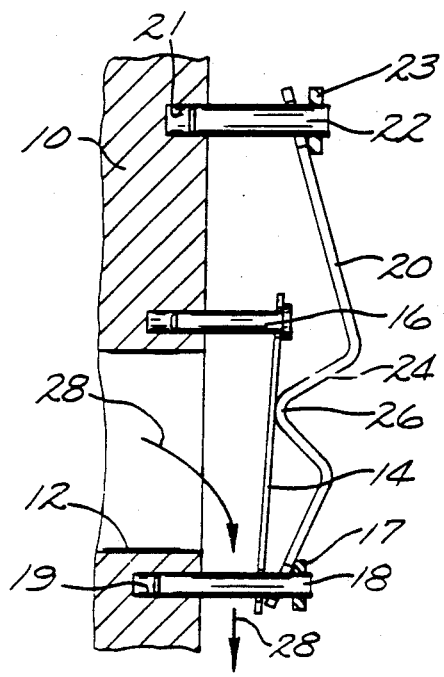

Thermostatic element 56, generally coextensive in length with base 32, is configured similar to element 20 shown in FIGS. 1 and 2 having a generally V-shaped force imparting portion 58 and apex 60 which is adapted to place a force on cover 52. However, the opposite ends of element 56 have been modified as will be explained below.

Figure 6:
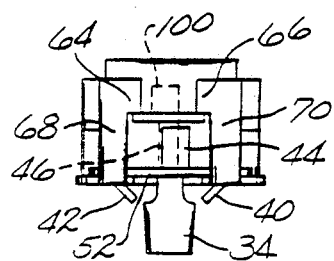
FIG. 6 is a left side elevational view of the FIGS. 3 and 4 valve.

With particular reference to FIGS. 3 and 6, end 62 of element 56 has a reduced width so that it is captured under laterally extending tabs 64, 66 which are formed on respective posts 68, 70 extending upwardly from base 32 at one end thereof. End 62 is also recessed at 72, in any suitable configuration as in the portion of a circle as shown, in order to provide access for a tool generally in alignment with the tang (see arrow 74 in FIG. 4) to facilitate installation of valve 30 on a transmission housing.

Figure 5:
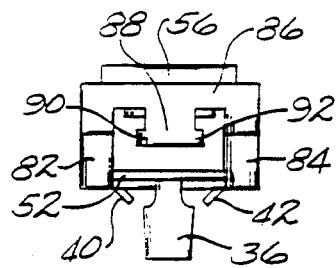
FIG. 5 is a right side elevational view of the FIGS. 3 and 4 valve.

Now with particular reference to FIGS. 3 and 5 the opposite end of element 56 is formed with two spaced fingers extending generally in the direction of the length of element 56. End 80 of base 32 is formed into a bracket with first and second legs 82, 84 extending upwardly and then back along the length of element 56 and joined together by transversely extending stop element 86. A downwardly depending generally inverted T-shaped member 88 extends from element 86 and has laterally extending tabs 90, 92 formed at its lower end. Fingers 76, 78 are respectively received on either side of member 88 with transversely extending element 86 limiting upward movement of element 56 and tabs 90, 92 limiting downward movement thereof. Fingers 76, 78 are cut away at 94 and 96 respectively in a manner similar to cut out portion 72 on the opposite end of element 56 to provide access for a tool to facilitate installation of the valve on a transmission case cover. It will be seen that the tangs 34 and 36 can be conveniently driven into bores 19 and 21 of case cover 10 by a tool placed directly in line with the tangs.

Valve 30 is calibrated by placing a force measuring gauge in engagement with the underside of cover 52 aligned generally with apex 60 of element 56, and with end 62 of element 56 received under tabs 64, 66 and fingers 76, 78 received under transversely extending stop element 86. Starting from a position generally indicated by the dashed lines in FIG. 4, bracket 80 is bent in a counter clockwise direction as seen in the Figure until the selected force for a given temperature is obtained on the gauge. When this selected or calibrated force is obtained the valve is ready for installation.

Aperture 96 shown in dashed lines in FIG. 3 may be provided as a pilot hole to facilitate manufacture of the valve. Aperture 98 also shown in dashed lines is preferably provided to allow a limited amount of oil to pass through from the auxiliary reservoir to improve heat coupling of element 56 with the oil in the auxiliary reservoir.

Post 46 is preferably provided with a transversely extending tab 100 at its distal free end to limit the outward movement of cover 52.

Figure 7:
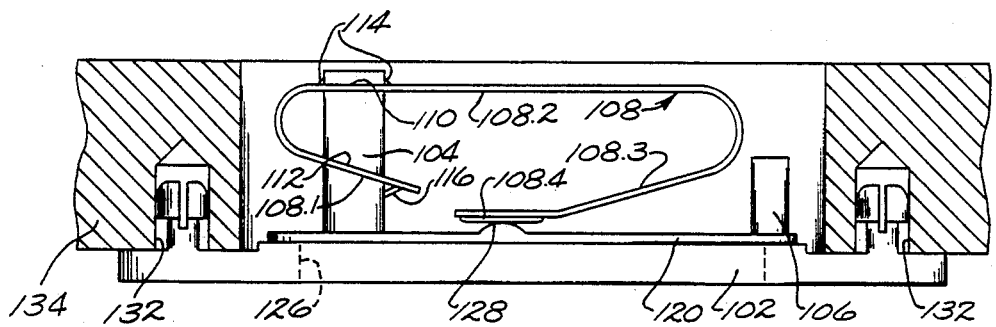
FIGS. 7 and 8 are a front and top view, respectfully, of an oil level control made in accordance with the present invention.
Figure 8:
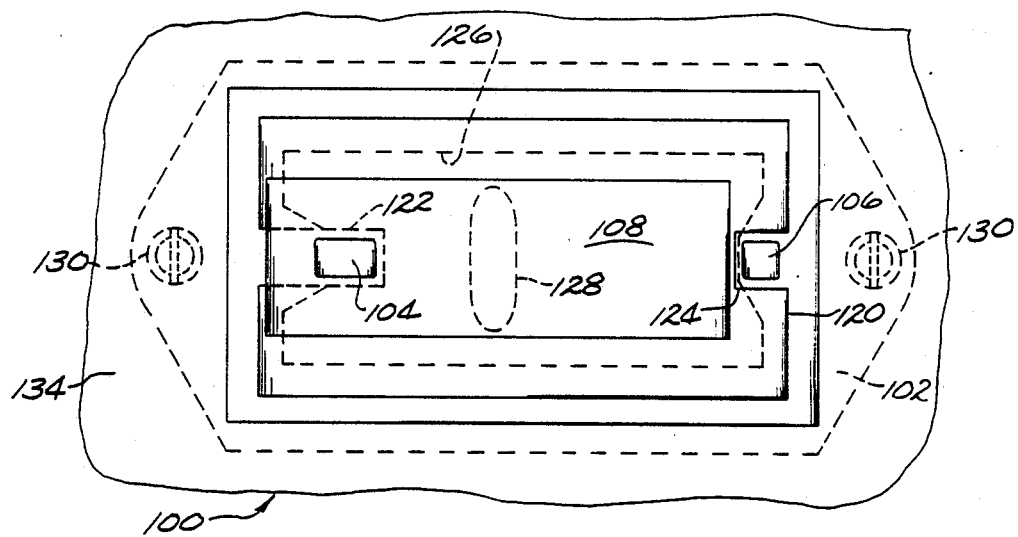

With particular reference to FIGS. 7 and 8 a valve assembly 100 is shown comprising a molded base 102 formed of suitable plastic material having a pair of post members 104, 106 extending upwardly therefrom. The first post member 104 serves as a mounting member for a thermostat element and, along with second post member 106, as a cover plate guide, as noted below. A generally U-shaped thermostatic element 108 having a first leg 108.1, a bight 108.2 and a second leg 108.3 is mounted on post member 104 by a first aperture 110 formed in the bight portion 108.2 of the U-shaped element 108 and a second aperture 112 formed in the distal end portion of leg 108.1 with the post member received through both apertures. Suitable teeth 114, 116 are formed adjacent the apertures and are adapted to bite or dig into the post member to maintain element in its selected position. At the time element 108 is assembled on post member 104 the first leg 108.1 is compressed slightly (toward the bight 108.2 of the U-shaped configuration). When the calibrated position is reached the leg is released to spring out biting into the post to stabilize the position of the element on the post member.

A cover plate 120, formed of stainless steel or other suitable material, has slots 122, 124 formed at two opposite ends to accommodate post members 104, 106 respectively and is disposed on base 102 and adapted to move up and down along the post members. Cover 120 fits over aperture 126 formed in base 102 and is adapted to essentially close the aperture when it is in contact with the base 102. Cover 120 preferably is formed with a transversely extending curved protrusion 128, for example, a generally cylindrical portion having a first longitudinal axis extending in a direction across the width of the cover member which cooperates with a longitudinally extending curved portion 108.4, for example, a generally cylindrical portion having a second longitudinal axis along the length of the strip at a right angle with the first longitudinal axis formed on end 108.3 of the thermostatic element so that a sliding point contact is obtained between the thermostat element and the cover. Base 102 is also preferably formed with split stud members 130 upwardly extending from two opposite ends of the base which are adapted to be received in an interference fit in bores 132 of an automotive transmission casting 134.

The thermostat element 108 is calibrated to place a predetermined preload on cover plate 120 covering the oil drain cavity in the transmission casting 134. As the oil temperature increases, its volume expands and the oil level in the reservoir increases. This increases the pressure on cover plate 120. Due to the temperature increase thermostat element 108 exerts pressure on cover plate 120 in the opposite direction to thereby modulate the opening to allow the oil to drain at a required rate to maintain a desired oil level in the sump.

Figure 9:
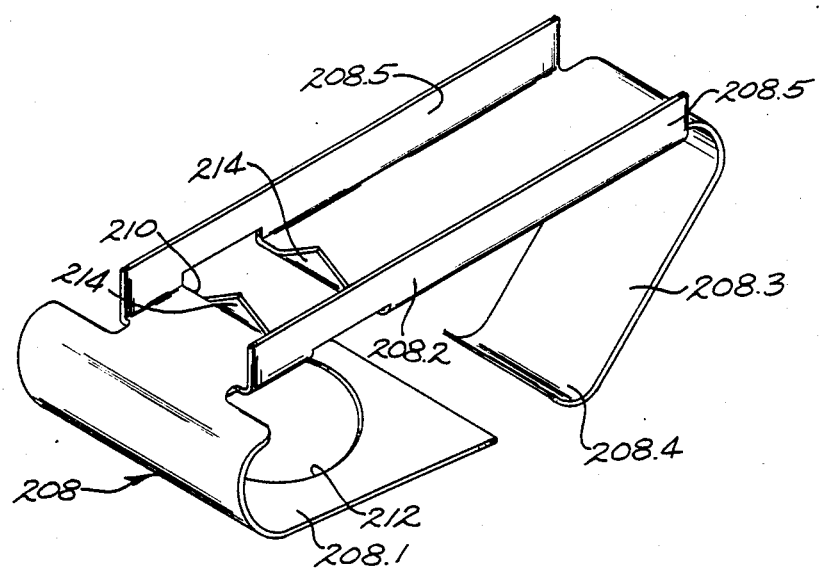
FIGS. 9 and 10 are perspective views of a thermostatic element and control valve assembly, respectfully, modified slightly compared to that shown in FIGS. 7 and 8.
Figure 10:
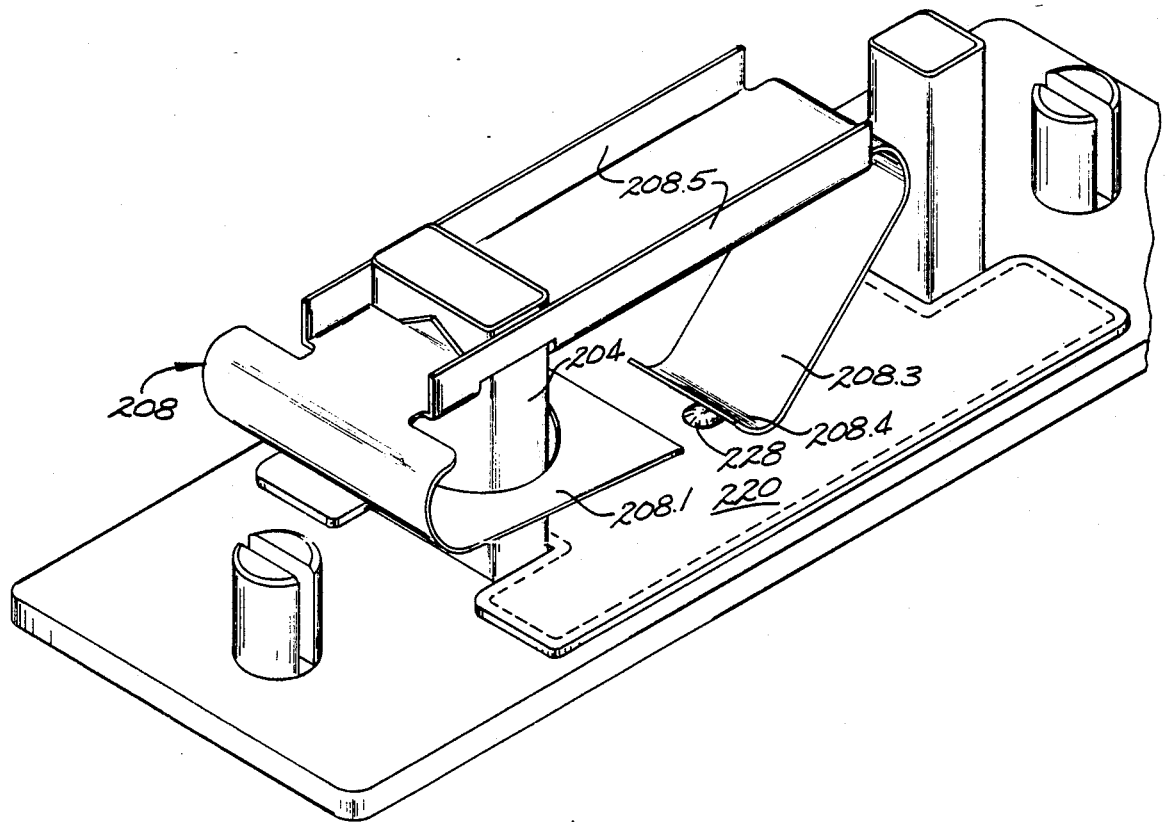

FIGS. 9 and 10 show a slightly modified assembly. Thermostat element 208 having opposite ends 208.1 and 208.3 with bight 208.2 connecting the two legs of the generally U-shaped element is shown with the distal free portion of end 208.3 formed into a laterally extending curved or generally cylindrical configuration 208.4 which cooperates with a curved or generally cylindrical portion 228 in base 220 extending longitudinally at a right angle relative to the transverse extension of curved portion 208.4 to obtain a sliding point contact between the thermostat element and the cover plate. Aperture 210, formed in bight 208.3 is shown with teeth 214, however, aperture 212 is generally circular so that when the calibrated position is reached and the compression on leg 208.1 is released the leg will spring out with two points on the perimeter of the aperture biting into corners of the rectangular post 204 to stabilize the position of element 208 on the post.

Bight 208.2 is shown with longitudinally extending flanges 208.5 to provide improved rigidity for transmitting force to the cover plate. In other respects the structure of the assembly is essentially the same as that shown in FIGS. 7 and 8 and need not be redescribed.

Thus it will be seen that a simple, easily manufactured thermostatic valve is provided by the invention which is calibratable prior to installation to a specific force level and then easily installed on a transmission case cover to permit improved performance thereof. The invention permits using the proper quantity of oil because of the improved consistency of the operation of the valve, a typical calibrated force for one type of transmission is 1.4 ounces and it has been found that providing the controls to within ten percent of the desired force level is readily achievable.

Although the invention has been described with respect to specific preferred embodiments thereof, many variations and modifications will become apparent to those skilled in the art. For example, it may be desired to provide frangible tangs in the event that it is desired to remove a valve while obviating any danger of damaging the transmission housing. It is the intent that the appended claims be interpreted as broadly as possible in view of the prior art to include all such variations and modifications.

We claim:

1. An oil level control valve comprising a base, first and second fastening members extending from the base adapted to be received in respective bores formed in a transmission housing, an oil receiving aperture formed through the base, first and second post member extending in parallel relation to one another from the base on opposite sides of the oil receiving aperture, a cover member received over the oil receiving aperture and being adapted to move toward and away from the oil receiving aperture, a generally U-shaped thermostatic strip having a bight portion intermediate a first and a second leg, first and second apertures formed in the bight and first leg respectively, the first leg being compressed by bending it toward the second leg with the apertures in alignment with one another and with the first post member received through the first and second apertures to mount the thermostatic strip thereon, the second leg having a distal end portion engaging the cover member with a preselected force whereby the cover member is biased toward the base with a force which varies with the temperature of the thermostatic strip.

2. An oil level control valve according to claim 1 in which the distal end portion of the second leg and a portion of the cover member both are formed with a generally cylindrical surface portion having cylindrical axes which are disposed at right angles to one another and are aligned with one another to provide a sliding point contact between the thermostatic element and the cover member.

3. An oil level control valve according to claim 1 in which the cover member is formed with first and second slots with the first and second post members received in the respective first and second slots to guide the cover member when it moves.

4. An oil level control valve according to claim 1 in which the first post member is rectangular and the aperture formed in the first leg is circular whereby portions of the thermostatic strip dig into respective corners of the first post member of stabilize its position at a selected calibrated position.

5. An oil level control valve according to claim 1 in which teeth are formed adjacent at least one aperture in the thermostatic strip and are adapted to bite into the first post member.

6. An oil level control valve according to claim 2 in which the fastening members are split studs.

7. An oil level control valve comprising a plastic base, an oil receiving aperture formed through the base, a first post member integrally formed with and extending from the base adjacent to the oil receiving aperture, a cover member received over the oil receiving aperture and being adapted to move toward and away from the oil receiving aperture, a generally U-shaped thermostatic strip having a bight portion intermediate a first and a second leg, first and second apertures formed in the bight and first leg respectively, the first leg being compressed by bending it toward the second leg with the apertures in alignment with one another and with the post member received through the first and second apertures to mount the thermostatic strip thereon, the second leg having a distal end portion engaging the cover member with a preselected force whereby the cover member is biased toward the base with a force which varies with the temperature of the thermostatic strip and means to guide movement of the cover member.

8. An oil level control valve according to claim 7 in which the distal end portion of the second leg is formed with a generally cylindrical surface portion having a first longitudinal axis extending laterally across the strip and the cover member has a generally cylindrically formed protrusion having a second longitudinal axis extending at a right angle with the first longitudinal axis to provide a sliding point contact between the thermostatic strip and cover member.

9. An oil level control valve according to claim 8 in which the second leg is prebent toward the first leg.

10. An oil level control valve according to claim 7 in which the distal end portion of the second leg is formed with a generally cylindrical surface portion having a first longitudinal axis extending along the length of the strip and the cover member has a generally cylindrically formed protrusion having a second longitudinal axis extending at a right angle with the first longitudinal axis to provide a sliding point contact between the thermostatic strip and the cover member.

11. An oil level control valve according to claim 10 in which the second leg is prebent toward the first leg.

12. An oil level control valve according to claim 7 in which the means to guide movement of the cover member includes a second post member extending from the base in parallel relation to the first post member and slots are formed in the cover member with the first and second post members received in respective slots.

13. An oil level control valve according to claim 7 in which the first post member is rectangular and the aperture formed in the first leg is circular whereby portions of the thermostatic strip dig into respective corners of the first post member to stabilize its position at a selected calibrated position.

14. An oil level control valve according to claim 7 in which teeth are formed adjacent at least one aperture on the thermostatic strip and are adapted to bite into the first post member.

15. An oil level control valve according to claim 7 further including fastening means for attaching the base member to a transmission housing.

* * * * *